(12) United States Patent
Church (10) Patent No.: US 8,136,846 B2
(45) Date of Patent: Mar. 20, 2012

(54) CYLINDRICAL TAPERED THREAD FORM FOR TUBULAR CONNECTIONS

(75) Inventor: Kris L. Church, Montgomery, TX (US)

(73) Assignee: Gandy Technologies Corporation, Conroe, TX (US)

( * ) Notice: Subject to any disclaimer, the term of this patent is extended or adjusted under 35 U.S.C. 154(b) by 562 days.

(21) Appl. No.: 12/272,227

(22) Filed: Nov. 17, 2008

(65) Prior Publication Data

US 2010/0123311 A1    May 20, 2010

(51) Int. Cl.
*F16L 15/06* (2006.01)
(52) U.S. Cl. .................................. 285/334; 285/333
(58) Field of Classification Search .................. 285/334, 285/333, 383; 411/426
See application file for complete search history.

(56) References Cited

U.S. PATENT DOCUMENTS

| | | | | |
|---|---|---|---|---|
| 1,599,270 | A * | 9/1926 | Axelson | 403/334 |
| 1,915,008 | A * | 6/1933 | Youker | 285/18 |
| 1,927,656 | A * | 9/1933 | Eaton et al. | 285/115 |
| 2,056,112 | A | 9/1936 | Protin | 285/333 |
| 2,204,754 | A * | 6/1940 | Frame | 285/334 |
| 3,574,373 | A * | 4/1971 | Le Derf et al. | 403/296 |
| 3,989,284 | A | 11/1976 | Blose | 285/332 |
| 4,033,167 | A * | 7/1977 | Philibert | 72/370.16 |
| 4,161,332 | A | 7/1979 | Blose | 285/334 |
| RE30,647 | E | 6/1981 | Blose | 285/332 |
| 4,346,920 | A * | 8/1982 | Dailey | 285/89 |
| 4,600,224 | A | 7/1986 | Blose | 285/334 |
| 4,629,223 | A * | 12/1986 | Dearden et al. | 285/334 |
| 4,696,498 | A | 9/1987 | Church | 285/334 |
| 4,875,710 | A * | 10/1989 | Mercado | 285/24 |
| RE34,467 | E * | 12/1993 | Reeves | 285/334 |
| 5,415,442 | A * | 5/1995 | Klementich | 285/331 |
| 5,462,315 | A * | 10/1995 | Klementich | 285/24 |
| 5,738,685 | A * | 4/1998 | Halm et al. | 606/270 |
| 6,158,785 | A | 12/2000 | Beaulier et al. | 285/334 |
| 6,254,146 | B1 | 7/2001 | Church | 285/334 |
| 6,581,980 | B1 | 6/2003 | DeLange et al. | 285/334 |
| 6,585,299 | B1 * | 7/2003 | Quadflieg et al. | 285/333 |
| 6,722,706 | B2 | 4/2004 | Church | 285/334 |
| 6,817,633 | B2 | 11/2004 | Brill et al. | 285/333 |
| 6,832,789 | B2 | 12/2004 | Church | 285/333 |
| 7,007,984 | B2 | 3/2006 | Church | 285/333 |
| 7,210,710 | B2 | 5/2007 | Williamson et al. | 285/333 |
| 2006/0157982 | A1 | 7/2006 | Hignett | |
| 2007/0228730 | A1 | 10/2007 | Sivley, IV et al. | |

* cited by examiner

*Primary Examiner* — James Hewitt
(74) *Attorney, Agent, or Firm* — Charles D. Gunter, Jr.

(57) ABSTRACT

A thread form is shown which is used to make a threaded connection between two tubular members and which is capable of being screwed together and subsequently unscrewed. A pin member is provided having external threads with stab flanks and load flanks and flat crests and roots for mating with the mating internal threads of a box member to make up a pipe connection. The thread crests on the pin member are cylindrical with respect to a central longitudinal axis of the tubular member while the thread roots are cut on a taper so that the height of the threads vary over the length of the thread form. The threads on the pin and box members can also be cut oppositely so that respective members of the thread forms are mirror images of each other.

11 Claims, 10 Drawing Sheets

CYLINDRICAL TAPERED THREAD FORM FOR TUBULAR CONNECTIONS

BACKGROUND OF THE INVENTION

1. Field of the Invention

The present invention relates to threaded tubular joints or connections and to a thread form for threaded connections of the type used for securing tubular flow conduits to form a desired continuous flow path.

2. Description of the Prior Art

A variety of threaded connections are known in the prior art for joining tubular flow conduits in an end-to-end relationship to form a continuous flow path for transporting fluid, gases or a combination of both. Typical examples of such flow conduits include casing, expandable casing, tubing, drill pipe and risers for oil, gas, water and waste disposal wells, and in horizontal and trenchless drilling applications. In the case of oil field casing and tubing, it is a common practice to use pipes of a definite length, with sections of pipe joined to form a string. The string of pipes effectively creates one lengthier pipe, intended to provide a means to reach the depth at which the reservoirs of gas or oil are found in order for extraction to the surface.

The pipe sections are secured together at their ends by an externally threaded connector, or "pin" that is threadedly received within an internally threaded connector or "box". Typically, each pipe section has a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length but can vary in length from 2 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down or pin up, into an upwardly or downwardly facing box projecting from the drilling rig floor. This procedure is commonly referred to as "stabbing" the pin into the box. After being stabbed, the added pipe joint is rotated to engage the threads of the pin and box, securing the joint to the string.

The connections for strings of drill pipe, tubing or casing must be able to withstand the total weight of a string of pipe many thousands of feet long. Since the drill string must also be used for the purpose of drilling, the joints must be able to withstand high torque loads, as well. Additionally, wells may not be driven in exactly vertical fashion or even in straight line fashion. Horizontal drilling operations are common today. The tubing used to drill the well and/or convey fluid from the well must be able to follow the course of the well as greater lengths are reached. This places bending loads on the drill, casing or tubing strings at various places along the length thereof. Sections of tubing or casing are sometimes driven into the well, resulting in axial compressive loads being exerted. Thus, in addition to withstanding tremendous tensile loads, the threaded connections in the pipe string must also be able to absorb considerable compression loads.

There have been numerous advances in thread technology of the type under consideration in recent years. For example, Re. U.S. Pat. No. 30,647 issued to Blose in 1981 disclosed a tubular connection having a thread form which provided an unusually strong connection while controlling the stress and strain in the connected pin and box members of the connection. The thread form featured mating helical threads which were tapered in thread width in opposite directions to provide wedge-like engagement of the opposing flanks to limit rotational make-up of the connection. The wedge thread, if properly designed, provides high torsional resistance without inducing axial or radial stresses into the tubular connection upon make-up of the joint, making it easier to break out the joints if this becomes necessary. By reducing axial or radial stresses in the threaded connection, a sounder connection is theoretically provided which is able to withstand a greater level of operating stress and strain.

U.S. Pat. No. 4,600,224, issued Jul. 15, 1986 to Blose was a refinement and further improvement to the basic wedge thread concept. In the invention disclosed in the '224 patent, a connection was shown having a "chevron" load flank. Radial make-up of the threaded connection was controlled by the special thread structuring where the radial movement of a thread into a mating thread groove was restricted by a chevron type interfit between two load bearing thread surfaces of the threaded connection instead of relying upon thread width alone.

Re. U.S. Pat. No. 34,467 issued Dec. 7, 1993 to Reeves purported to be an improvement to the basic Blose wedge thread design. As explained by the patentee, when Blose's connection is rotatably made up to engage both the front and back thread flanks, incompressible thread lubricant or other liquid may be trapped between the engaged load flanks. This trapped thread lubricant can resist the make-up torque and give a false torque indication that results in lower than desired stress and strain being induced in the Blose connection and reducing the design strength and load carrying capacity. The invention described in Re. U.S. Pat. No. 34,467 purports to preclude the possibility of false indication of torque by excluding thread lubricant from between the thread load flanks that are brought into engagement at make-up.

In Re. U.S. Pat. No. 30,647 and Re. U.S. Pat. No. 34,467, the preferred threads were "dovetailed-shaped" in cross section, being wider at the crests than at the roots. U.S. Pat. No. 4,600,224 was a departure from the Blose design in that a semi-dovetail or partial dovetail thread was disclosed. However, the thread crest width continued to be greater than the thread root width as in the traditional definition of the term "dovetail."

U.S. Pat. Nos. 6,254,146 and 6,722,706, to Kris L. Church, were directed to further improvements in thread forms of the type under consideration. The thread forms shown in these earlier Church patents include a special thread structuring where the radial movement of one thread into a mating thread groove is controlled by a complex profile interfit between the two mating thread surfaces of the threaded connection. The complex profile can be present on the stab flank, on the load flank, or on a combination of the two flanks. A controlled clearance is provided between the mating crests of the interengaged threads to prevent hydraulic pressure buildup caused by entrapped lubricant between the thread crests and roots. The stab and load flanks complex profiles are preferably multi-faceted flanks, each having at least three facets and four radii per flank. The pin thread crests have a crest width and the pin roots have a root width. The width of the crest is less than the width of the roots, which is exactly opposite that of the general dovetail design.

Despite the improvements in thread form design discussed above, a need continues to exist for an improved thread form which is capable of coupling tubular pipe sections quickly and efficiently, and which forms a secure connection.

A need also exists for an improved thread form for coupling of tubular pipe sections that maximizes the connection's "real-estate area" available in the geometry of the design to thereby maximize the desired properties of the connection for a given connection length.

A need also exists for such a thread form which minimizes the amount of thread material cut away during the threading operation performed in machining of the thread form.

A need exists for such a connection which is high in tensile strength, which can withstand extremely high torque, and which features fast make-up characteristics.

A need also exists to design a short length connection, using such an improved thread form, without sacrificing the integrity of the connection.

A need also exists to design a connection on plain end pipe, using such an improved thread form, that has comparable performance properties of a more expensive forged upset designed connection.

SUMMARY OF THE INVENTION

The present invention has as its object to provide a further modification of the basic thread forms discussed above which provides improved design characteristics and performance over the prior art and which meets the variously enumerated needs of the prior art discussed above.

A tubular member is provided having a cylindrical body defined about a central longitudinal axis and having a thread form for making a threaded pipe connection capable of being screwed together and subsequently unscrewed. In one preferred form of the invention, a pin member is provided having external threads cut over a given thread length with stab flanks and load flanks and flat crests and roots for mating with the mating internal threads of a box to make up a pipe connection. The thread crests are cut on an axis which is parallel to the central longitudinal axis of the tubular member. The thread roots are cut on a tapered axis with respect to the central longitudinal axis of the tubular body, whereby the threads have a given thread height which is measured between the thread crests and roots, and wherein the thread height varies over the length of the thread form.

A mating box member is provided having internal threads cut over a given thread length with stab flanks and load flanks and flat crests and roots for mating with the mating external threads of a pin to make up a pipe connection. The thread crests are cut on an axis which is tapered with respect to the central longitudinal axis of the tubular member. The thread roots are cut on an axis which is parallel to the central longitudinal axis of the tubular body, whereby the threads have a given thread height which is measured between the thread crests and roots, and wherein the thread height varies over the length of the thread form.

The pin and box members could also be machined in an exactly opposite fashion so that, for example, the pin member has cylindrical roots and tapered crests with a varying thread height. The threads may be provided with positive flanked angled thread teeth, neutral or square angled flanked teeth, negative angled flanked teeth, multifaceted angled flanked teeth, or any combination of the stated angled flanks.

The thread forms of the invention have particular utility in applications requiring the maximization of tensile strength and torque, for example, in forming tubular connections used in the horizontal directional drilling industry. However, the tubular member may also be one which is used in oil, gas, construction, water and waste disposal well casing and tubing or may be utilized in a "trenchless drilling" application. Connection designs using the thread forms of the invention also have inherent capabilities for incorporating multi-start threads.

Additional objects, features and advantages will be apparent in the written description which follows.

DETAILED DESCRIPTION OF THE INVENTION

The invention described herein and the various features and advantageous details thereof are explained more fully with reference to the non-limiting examples which are illustrated in the accompanying drawing and detailed in the following description. Descriptions of well-known components and processes and manufacturing techniques are omitted so as to not unnecessarily obscure the workings of the invention. The examples used herein are intended merely to facilitate an understanding of ways in which the invention herein maybe practiced and to further enable those of skill in the art to practice the invention. Accordingly, the examples should not be construed as limiting the scope of the claimed invention.

For simplicity sake, the invention will be described in terms of a section of oil field drill pipe. It will be understood by those skilled in the relevant arts, however, that the thread form of the invention could be incorporated into a wide variety of threaded connections in a variety of different industries.

Figure 1:
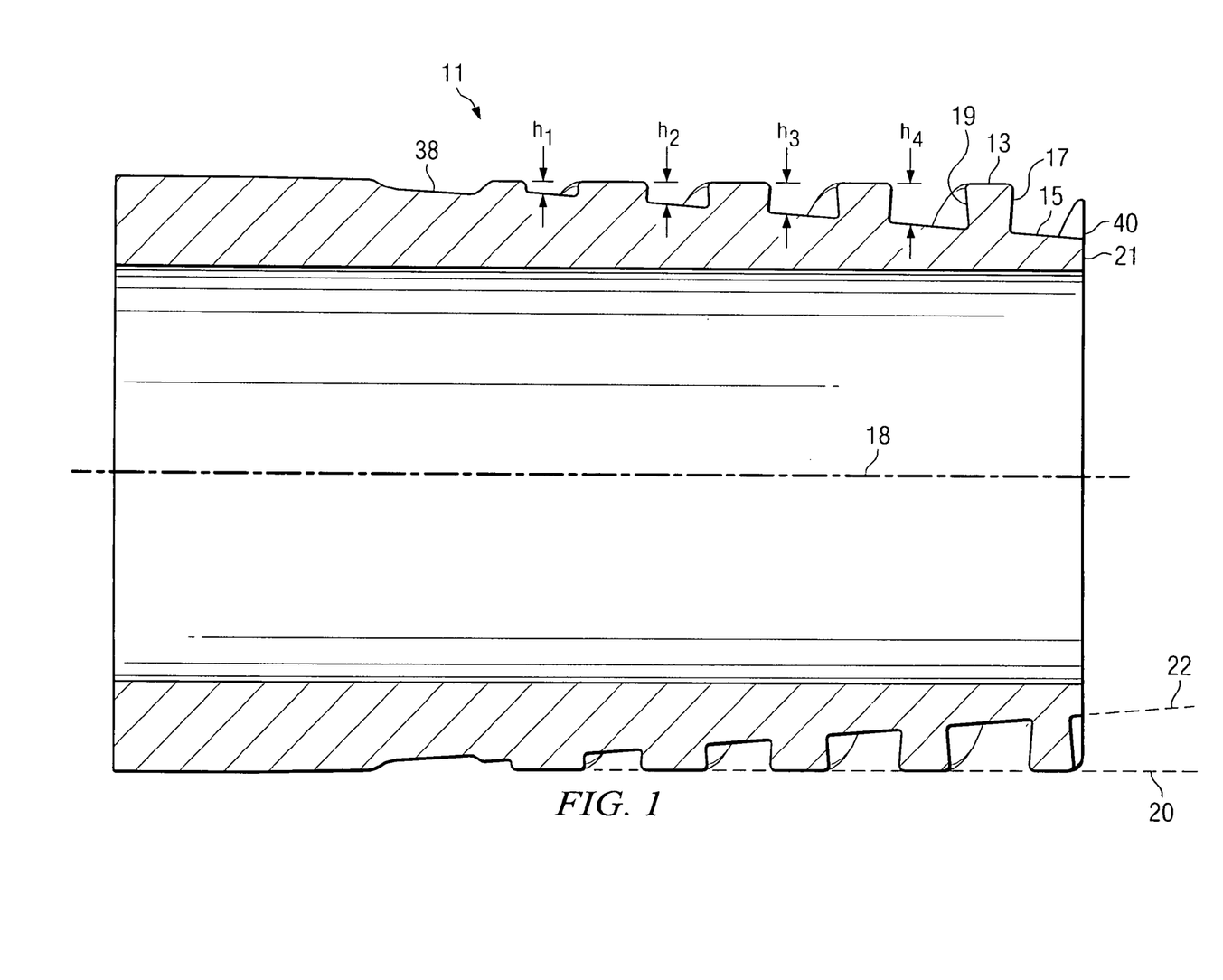
FIG. 1 is a side, cross-sectional view of the pin end of a section of pipe employing the thread form of the invention where the threads in question are dovetail wedge threads.

Turning to FIG. 1 of the drawings, there is shown a cross sectional view of a pin end of a section of tubular pipe, such as a section of oil field drill pipe, employing the thread form of the invention, the section of pipe being designed generally as 11. Although only the pin end of the connection is shown, it will be understood that the pin end is intended to be made up with a mating box end to form the pipe connection. Even in the area of oil field tubular goods, the thread forms of the invention can be applied to a wide variety of products. Typical applications could include, but are not limited to, oil and gas offshore and onshore sub surface casing, intermediate casing, production casing, expandable casing, work over tubing, production tubing, tiebacks, risers, pile driving casing, line pipe, drill pipe, TNT pipe, flush joints, HDD pipe, water well pipe, liners for construction applications, mining pipe, and disposal wells. Also, those skilled in the art will understand that the thread forms of the invention can be used in a variety of known types of pipe connections of this same general type, including connections which are swaged, expanded, upset or non-upset. The preferred thread forms are non-upset. The thread forms of the invention can also be used in connections which are helically structured as wedge threads such as those described in Blose Re. U.S. Pat. No. 30,647 and Reeves Re. U.S. Pat. No. 34,467.

The thread forms of the present invention are well suited to a variety of the newly emerging drilling technologies. For example, it is known to use a vertical drilling rig in oil and gas well drilling. Conventional vertical drilling rigs use heavy drill pipe or drill collars which add to the weight of the pipe string and exert downward force on the drill bit as it enters the earth's surface and begins the well bore. It is also known to drill oil and gas wells in a vertical direction initially and then deviate or turn the well bore in increments toward a horizontal direction as the drill bit reaches the target formation. The bore hole is then continued in the horizontal direction for a distance. This method, referred to herein as directional drilling, exposes a greater volume of the oil and gas of the formation to the well bore and has the potential of producing a higher and longer producing well.

In order to convert a vertical drilling rig to accomplish the combination vertical-horizontal drilling, it is necessary to retrofit the vertical drilling rig with a top drive adapted to fit into the derrick structure and provide rotational force to the drill pipe, rather than just a rotary table and Kelly bar. The top drive provides thrust and pull-back forces which are needed while drilling in the horizontal direction. However, the distances of the horizontal runs produced by conventional devices and methods are limited by the capability of the top drive to apply thrust and pull-back forces to the drill pipe. The diameters of the horizontal runs are also limited by the ability to apply thrust and pull-back forces to the drill pipe. It is also known to use a variation of the vertical-horizontal drilling method previously described which is called slant drilling. In slant drilling, the drilling rig is retrofitted such that the derrick is disposed at an angle, for example, 45 to 60 degrees from horizontal. A top drive applies the rotational, thrust and pull-back forces to the drill pipe.

The above discussed emerging drilling technologies all have the potential of utilizing the improved thread forms of the invention. By utilizing such improved thread forms, increasingly heavy torque loads can be tolerated while maintaining a secure connection between pipe joints. This may be especially advantageous in HDD applications which have increased torque requirements, as well as in "macaroni" pipe strings in conventional vertical wells where the pipe strings extend many thousands of feet in length.

Figure 2:
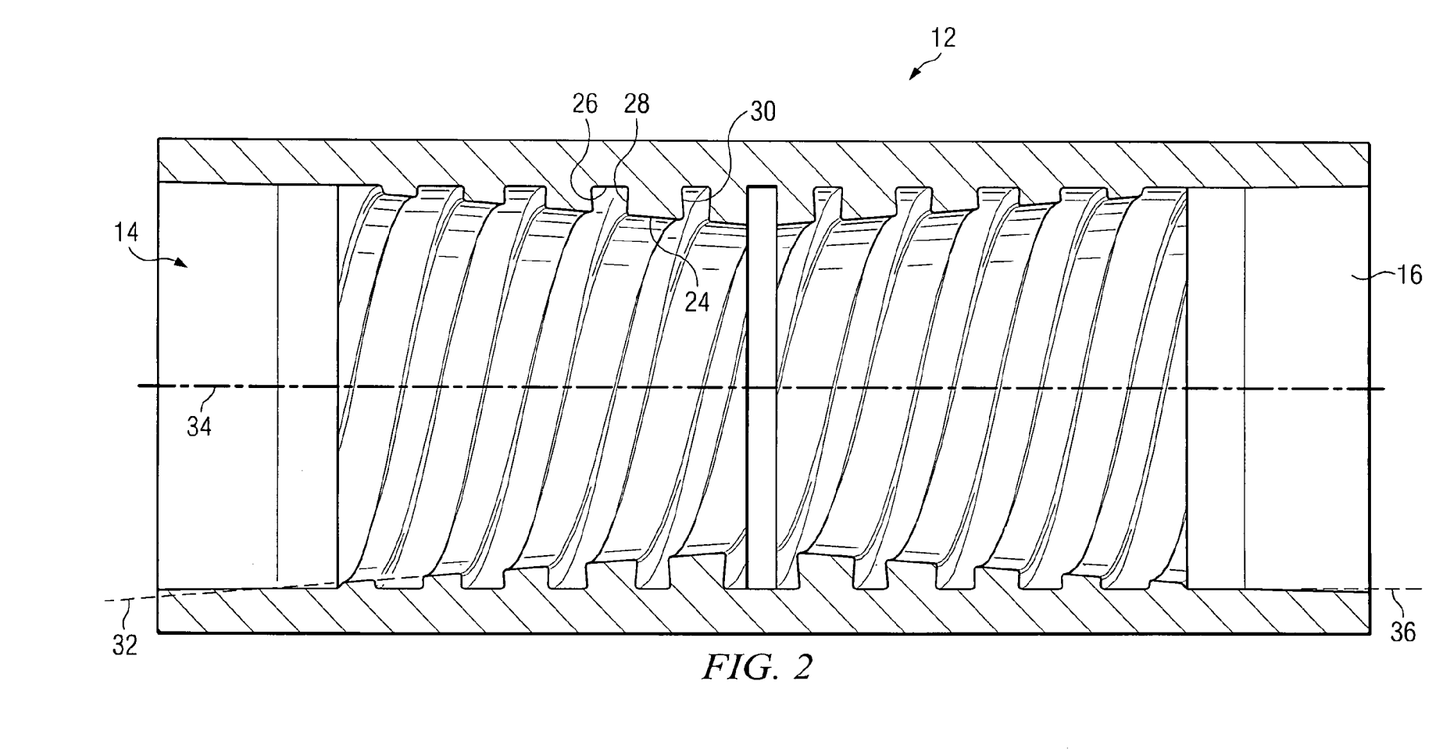
FIG. 2 is a cross-sectional view, similar to FIG. 1, showing a coupling member having two oppositely arranged box ends which each employ the thread form of the invention.

Referring again to FIG. 1, the pin end 11 of the tubular member has external pin threads with thread crests 13 and thread roots 15. The crests 13 and roots 15 of the pin member 11 are adapted to be made up with a mating box member 12 (FIG. 2), having a complimentary thread structure. While the box member 12 in FIG. 2 is a coupling having opposing end openings 14, 16, it will be understood that the box could be the box end of a section of plain pipe, or upset pipe. The box ends 14, 16 are essentially a mirror image of the pin end. Returning again to FIG. 1, it can be seen that the pin thread crests 13 are formed between a stab flank 17 and a load flank 19 of the pin thread. The thread crests 13 are approximately parallel to, i.e., "cylindrical" with respect to, to the central longitudinal axis 18 of the generally cylindrical tubular pin member 11. In other words, the imaginary axis 20 is approximately parallel to the axis 18 of the pipe.

As used herein, the term "load flank" will be understood to designate that sidewall of a thread that faces away from the outer end from the respective male or female member on which the thread is formed, and the term "stab flank" will be understood to refer to that sidewall surface that faces toward the outer end of the respective male or female member. With respect to the thread form shown in FIG. 1, the pin nose or outer end 21 would be located toward the right as viewed in FIG. 1 of the Drawings.

It will also be appreciated with respect to FIG. 1 that the thread roots 15 are cut on a taper with respect to the central longitudinal axis 18. In other words, the imaginary axis 22 is non-parallel with respect to the central longitudinal axis 18. If extended far enough out, the imaginary axis 22 would intersect the central axis 18. Each of the threads in FIG. 1 has a given thread height measured between the thread crests and roots 13, 15, respectively. As will be appreciated from FIG. 1, the thread heights "$h_1$", "$h_2$", "$h_3$" and "$h_4$" vary along the length of the thread (the length between points 38 and 40 in FIG. 1 which is threaded). As viewed in FIG. 1, the thread heights gradually increase in dimension from left to right in the drawing, i.e., in the direction of the pin nose 21 in ever increasing increments. Thus, "$h_2$" is greater than "$h_1$", "$h_3$" is greater than "$h_2$", etc. The thread heights for the preferred connection of the invention will typically be greater than the prior art. The average thread height of the pin treads will tend to be about 0.04 inches, or greater. For example with a 2⅜ inch connection of the prior art having an average thread height of 0.032 inch, the comparable thread form of the invention would have an average thread height more on the order of 0.060 to 0.500 inch, depending upon the pipe wall. One aspect of the present invention is that the pipe connections of the invention will tend to have a characteristic increased radial interlock at the box face region due to an increased thread height in that region of the connection. Conversely, the connection can be designed to have an increased radial interlock at the pin nose region due to an increased height in that region of the connection. The particular pin member 11 shown in FIG. 1 of the drawings happens to incorporate "dovetail" type threads in which the width of each individual thread tooth at the crest 13 is greater than the width of the thread at the base or root region thereof. However, for purposes of the present invention, it will be appreciated that the threads may be provided as, e.g., positive flanked angled thread teeth, neutral or square angled flanked teeth, negative angled flanked teeth, multifaceted angled flanked teeth, or any combination thereof.

Figure 6:
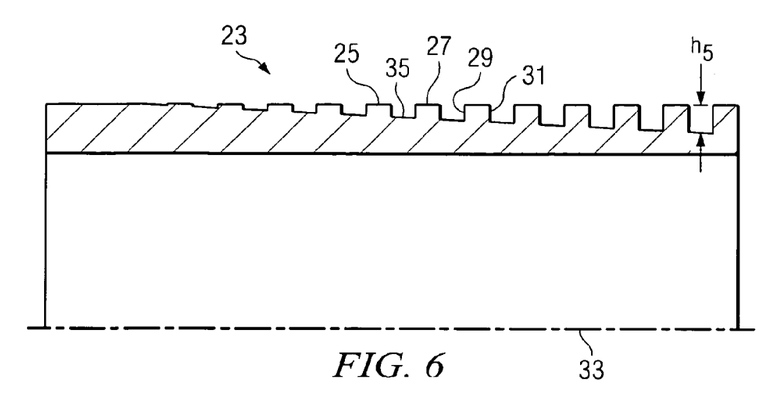
FIG. 6 is a quarter sectional view of the pin end of a section of pipe employing the thread form of the invention where the threads in question are neutral or square angled flank teeth.
Figure 7:
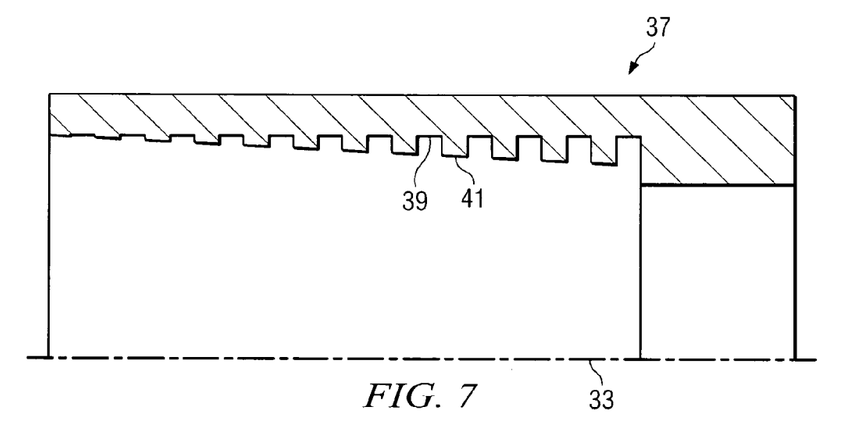
FIG. 7 is a quarter sectional view, similar to FIG. 6, of the mating box end of a section of pipe employing the thread form of the invention.
Figure 8:
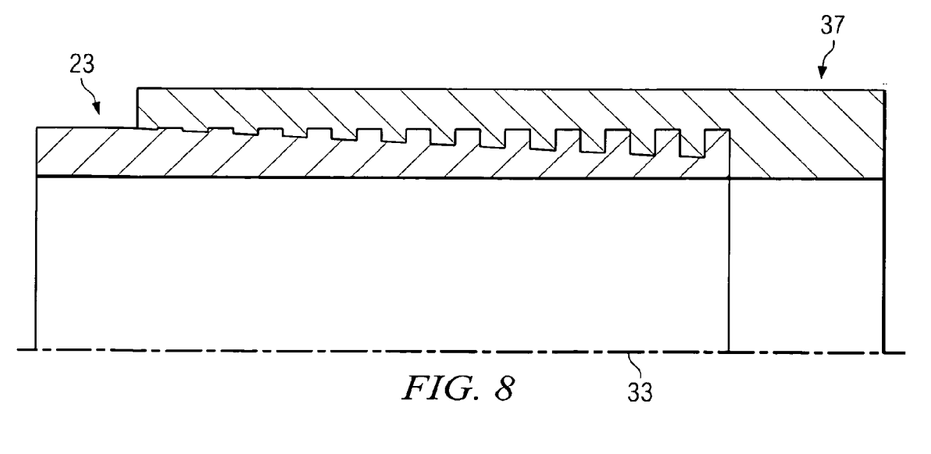
FIG. 8 is a quarter sectional view of the pin end of the section of pipe of FIG. 6 being received within the mating box end of FIG. 7.
Figure 9:
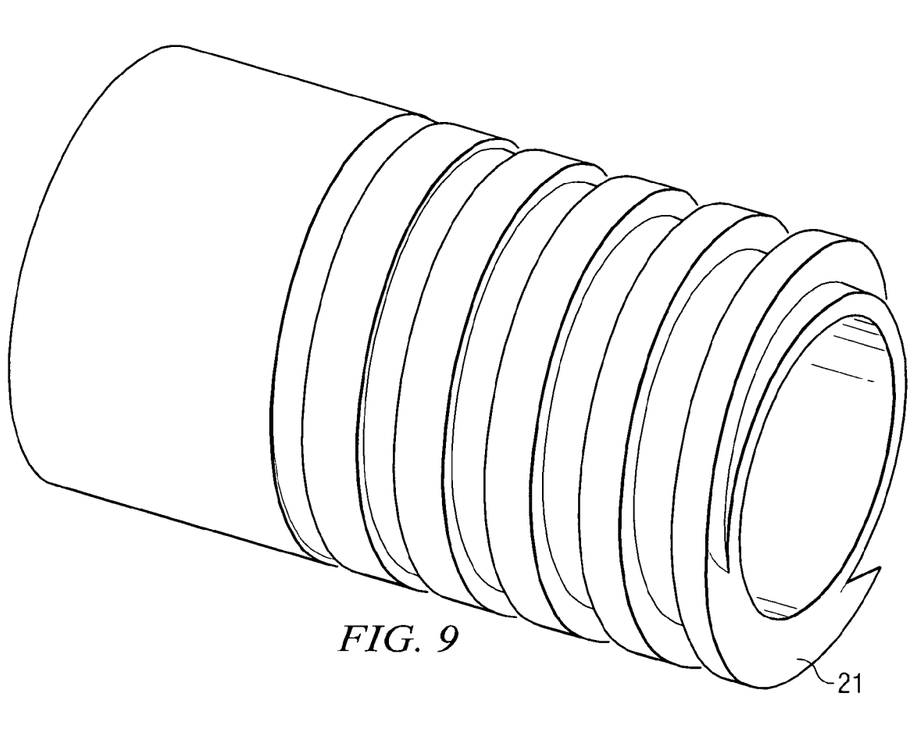
FIG. 9 is a perspective view of the pin end of the pipe section of FIG. 6, employing the thread form of the invention.

With reference to FIGS. 6-8 of the drawings, it will be appreciated that the pin member 23 has individual teeth, e.g., teeth 25, 27 with neutral or square angled flanks 29, 31. The diameters of the thread crests 25, 27 are constant, while the thread roots 35 are cut on a taper. The mating box member 37 shown in FIG. 7 has thread roots 39 which are cylindrical or parallel to the longitudinal axis 33, while the thread crests 41 are tapered. FIG. 8 shows the make up of a threaded connection having the thread form of the invention in which the individual thread teeth are neutral or square angled flanked teeth.

The thread form shown in FIG. 6 also emphasizes the increased thread height of the thread teeth and of the unusually high thread height in the pin nose region (illustrated as "h$_5$" in the drawing). This is due to the fact that the thread crests, e.g., crests 25, 27, remain parallel or cylindrical with respect to the longitudinal axis 33 of the section of pipe, while the thread roots, e.g., root 35 is cut on a taper.

While the pin thread crests are shown in the preferred form in FIG. 1 as being cylindrical or parallel to the central longitudinal axis 18 and thus non-tapered, it will be appreciated that the crests could be cut to be slightly tapered, as well. For example, the thread crests might be given a slight taper for achieving an interference fit in a gas tight connection. However, in any event, the taper of the thread roots will be greater, i.e., steeper, than any taper of the thread crests, according to the principles of the invention.

Figure 10A:
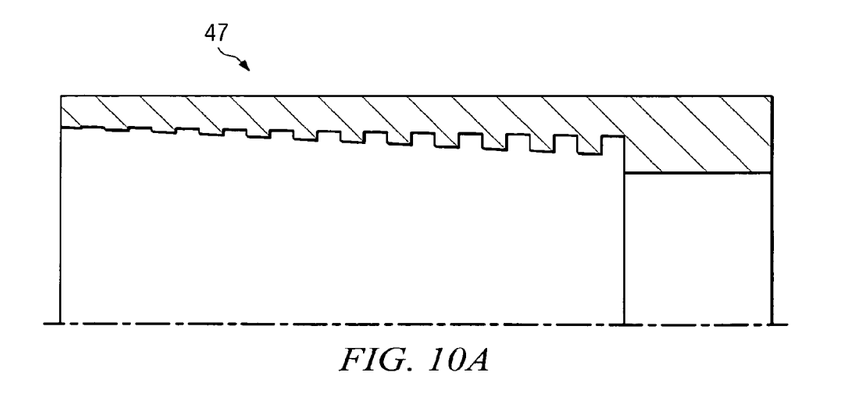
FIGS. 10A-10C are quarter sectional views of mating pin and box members employing the thread form of the invention where the members have slightly tapered pin crests and a relatively tall thread height at the pin nose.
Figure 10B:
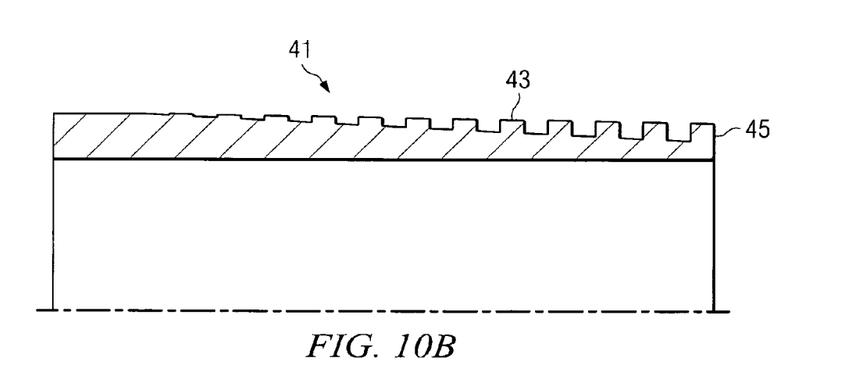
Figure 10C:
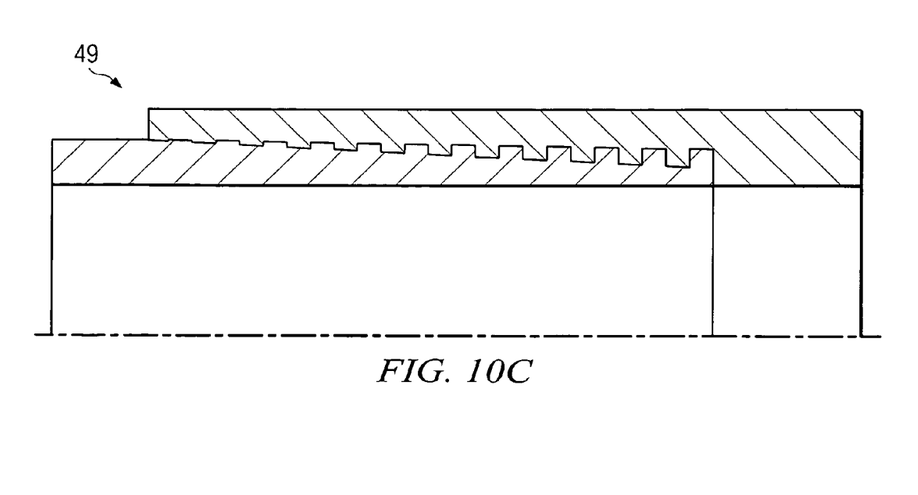

FIGS. 10A-13C are intended to further illustrate the "increased thread height" feature of the invention, and also the fact that the thread crests can be slightly tapered. With reference to FIG. 10A, the pin member 41 has slightly tapered thread crests 43 and relatively tall thread height at the pin nose 45. The mating box member 47 is machined in the opposite manner to allow the connection to be made up as illustrated by the completed connection 49 shown in FIG. 10C.

Figure 11A:
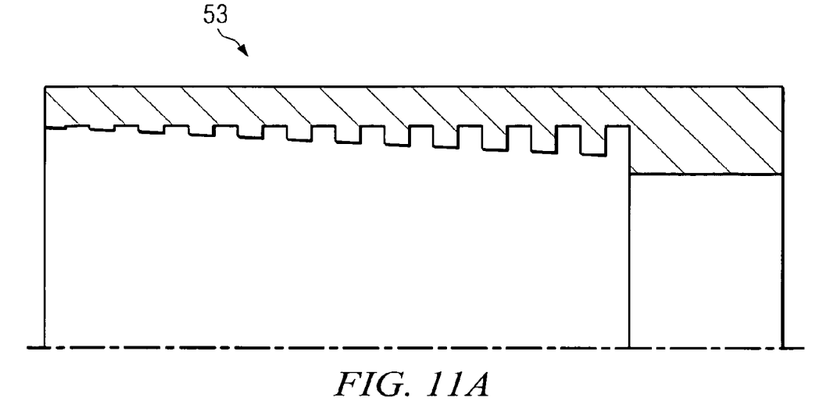
FIGS. 11A-11C are similar quarter sectional views showing mating pin and box members with cylindrical pin crests and relatively tall thread height at the pin nose.
Figure 11B:
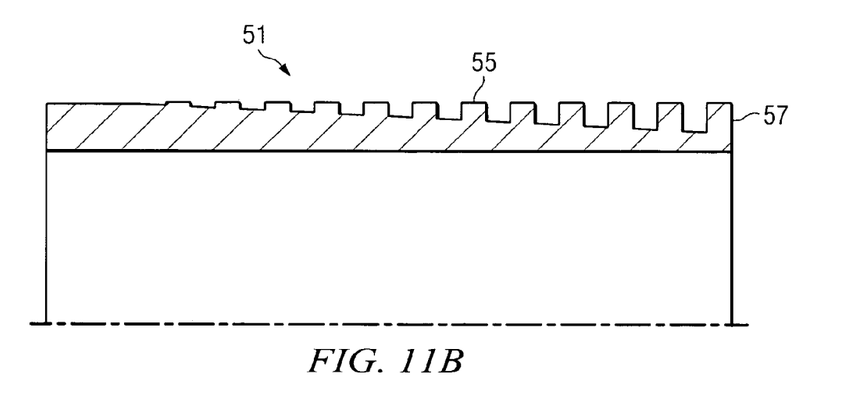
Figure 11C:
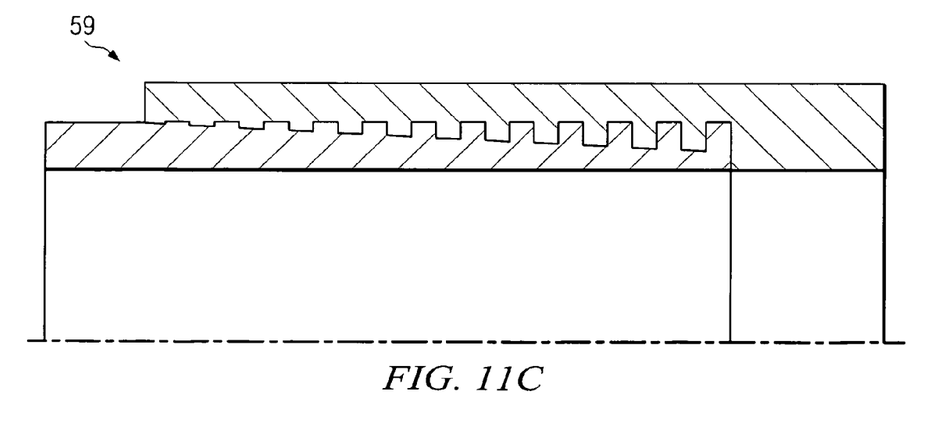

FIGS. 11A-11C illustrate similar pin and box members 51, 53, respectively, in which the pin member 51 has cylindrical pin crests 55 and a relatively tall thread height at the pin nose 57. The made up connection is illustrated as 59 in FIG. 11C.

Figure 12A:
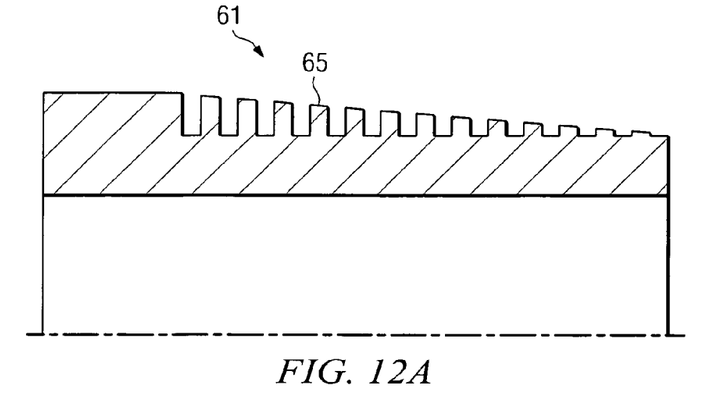
FIGS. 12A-12C are similar quarter sectional views showing mating pin and box members with tapered pin crests and relatively tall thread height at the box nose.
Figure 12B:
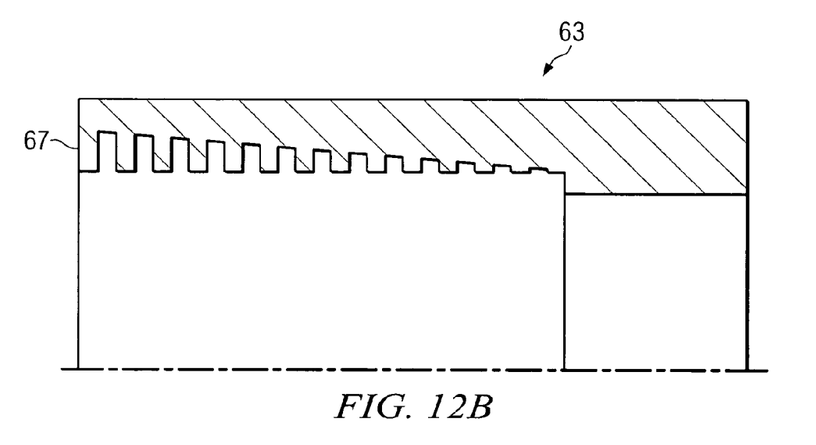
Figure 12C:
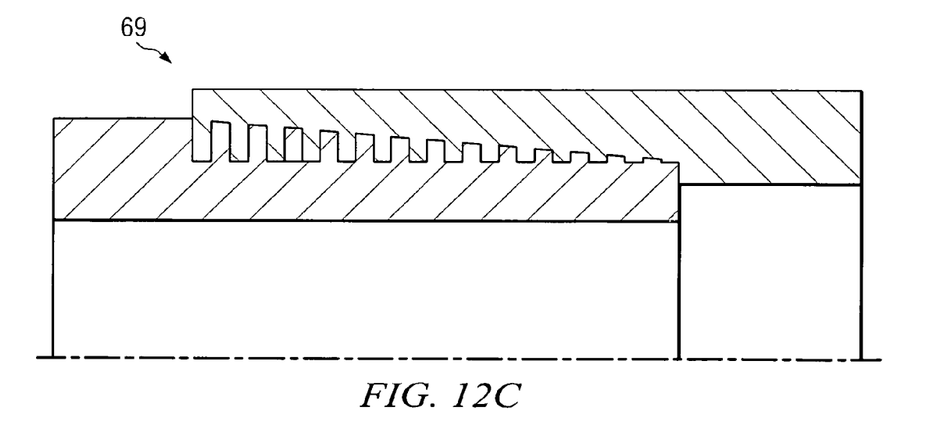

FIGS. 12A-12C illustrate similar pin and box members 61, 63, respectively, in which the pin crests 65 are tapered and with a relatively tall thread height at the box nose 67. The completed connection is illustrated as 69 in FIG. 12C.

Figure 13A:
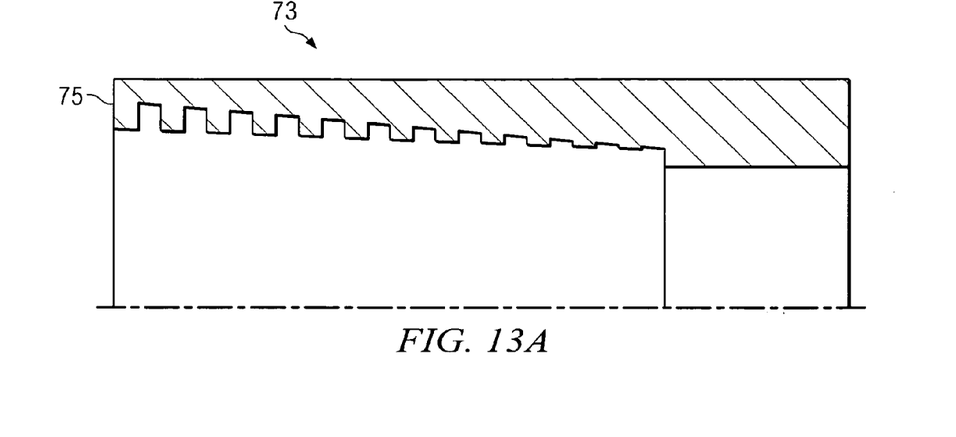
FIGS. 13A-13C are similar quarter sectional views showing mating pin and box members with slightly tapered pin crests and relatively tall thread height at the box nose.
Figure 13B:
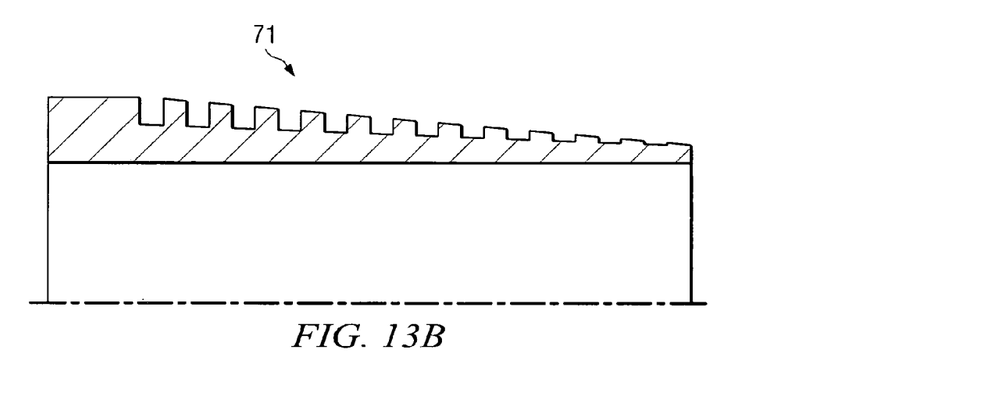
Figure 13C:
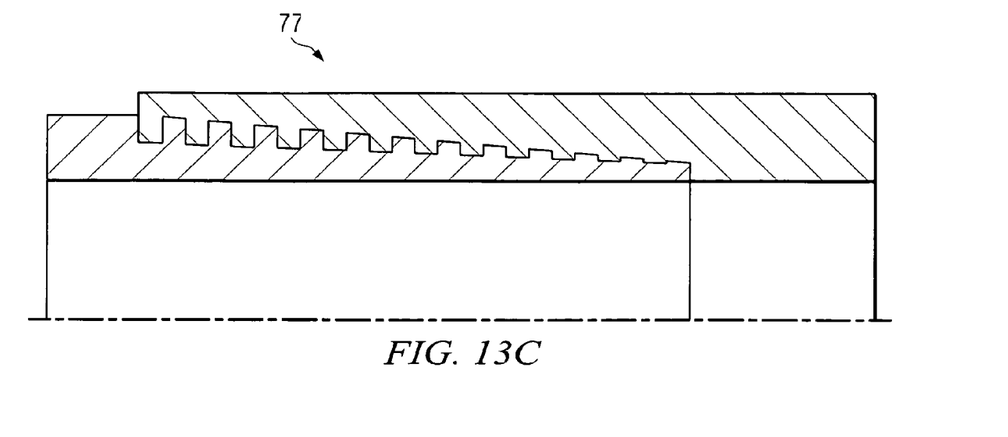

FIGS. 13a-13C illustrate a still further version of the thread form of the invention in which the pin and box members 71, 73, respectively, feature slightly tapered crests on the pin and with a relatively tall thread height at the box nose 75. The completed connection is illustrated as 77 in FIG. 13C.

With reference now once again to FIG. 2, it will be seen that the mating box coupling member for the dovetail thread form of FIG. 1 has internal threads defined by thread crests 24 and thread roots 26, stab flanks 28 and load flanks 30. The box ends are exactly opposite the pin ends. In other words, the imaginary axis 32 of the crests is non-parallel to the central longitudinal axis 34 while the imaginary axis 36 of the roots is cylindrical or parallel to axis 34.

In some cases, the thread forms of the invention can be helically structured as a wedge. In other words, both the pin and box threads are machined as helical wedge threads and thus have progressively changing axial width along the helical length thereof. In other words, with reference to FIG. 1, the threads on the pin member 11 could be machined so that the thread width of each successive thread progressively decreases from the inner extent 38 of the pin member along the helical length thereof to the outer extent 40 adjacent the mouth of the pin member. The axial thread width of the box member would progressively decrease in the opposite direction. The progressively changing axial width of the pin and box threads provides a wedging interfit to limit axial make-up of the tubular connection. Further details of "wedge" thread forms can be gained from the previously referenced Re. U.S. Pat. No. 30,647 issued to Blose in 1981, and similar references which will be familiar to those skilled in the art of thread form design.

If desired, the thread forms of the invention can also be provided as so-called "multi-start" threads. Multi-start threads are commonly found on a variety of consumer goods such as medicine bottles, beverage bottles, and the like, where just a short twist (e.g., a quarter of a turn) is desired for convenience in opening. In recent years, increased interests has arisen upon oil field thread forms which are multi-start threads. Incorporation of a multi-start thread would theoretically improve the speed of pipe makeup, raise torque resistance, and aid in fatigue resistance. Depending on how much or little twist is needed on the particular product at hand, as much as eight starts on the thread form are commonly observed.

As an example of what is meant by the term "multi-start thread", a dual start thread would have two threads which typically start at circumferentially opposing locations on the pin member and the box member, with one thread being equally spaced circumferentially. In cross-section, the double-start thread on a pin member thus closely resembles a conventional single-start thread on a pin member, although the double start thread theoretically offers the advantage of a faster make-up since the double-start thread would typically make-up with half the number of revolutions of a single start thread. Threads with three or more starts on the pin member and the box member have also been proposed. In the consumer arts, depending upon the degree of twist required, thread forms with up to eight starts are not uncommon. All of these types of threads with two, three, or more, i.e., a plurality of starts, will be referred to herein as being "multi-start threads."

Figure 4:
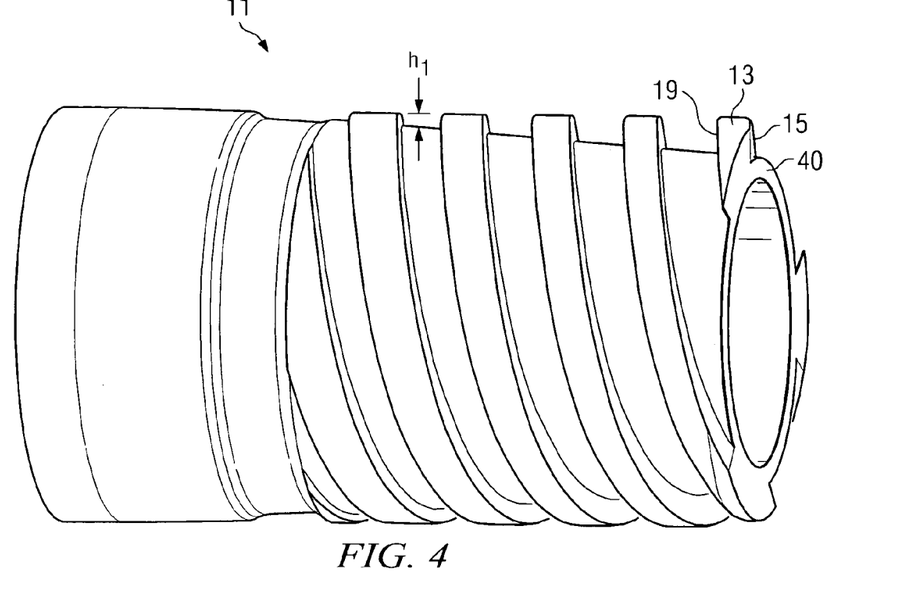
FIGS. 4 and 5 are perspective views of a pin member incorporating the thread form of the invention, the threads of which are also so-called multi-start threads.
Figure 5:
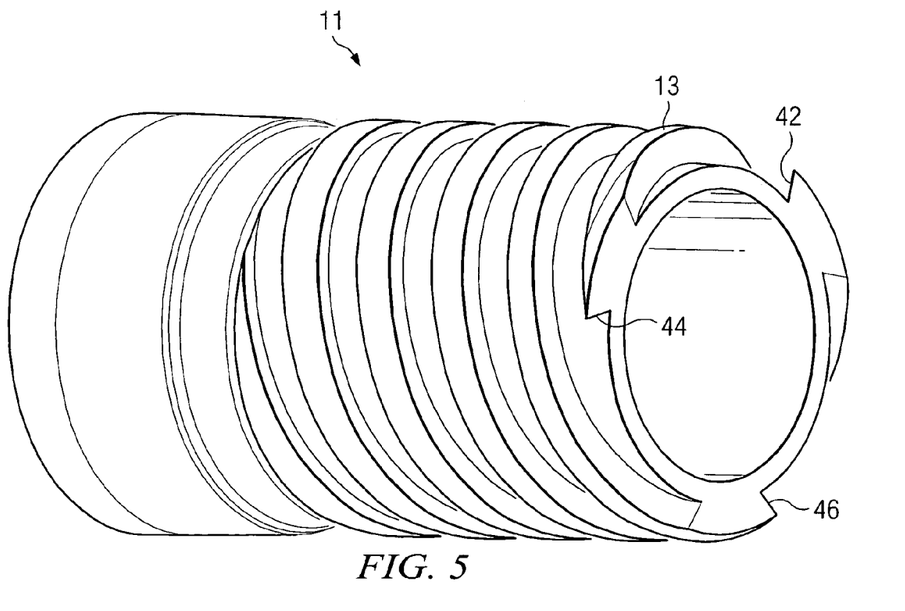

FIGS. 4 and 5 of the drawings, by way of example, shows a thread form of the invention on a pin member 11, the pin member also being a multi-start thread. As can perhaps best be seen in FIG. 5 of the drawings, the multi-start thread form illustrated has three starting threads. Thus, the pin member 11 is provided with at least three external threads, each of which has a thread start, e.g., starts 42, 44 and 46. The mating box member (not shown) has an equal number of internal threads having an equal number of thread starts. The thread starts of each thread on the box member will typically be oriented symmetrically apart from one another and the thread starts of each thread on the pin member may be oriented symmetrically apart from one another. Upon make-up, the load and stab flanks of each external thread on the pin member comes into contact with the mating load flanks of the corresponding internal thread and the mating stab flanks of the adjacent internal thread on the box member. The particular thread form shown in FIGS. 4 and 5 also happens to be a so-called wedge thread. Thus the internal threads of the box member are dimensioned to increase in width in one direction while the external threads of the pin member are dimensioned to increase in width in the other direction so that the complementary internal and external flanks of the wedge threads move into engagement upon make-up of the connection.

By way of further example, in the case of a thread form of the invention which is also provided as a multi-start thread having two thread starts, the box member will have two internal threads and the pin member will have two external threads. The two thread starts of the threads on the box member will then preferably be 180 degrees opposed and the two thread starts of the threads on the pin member will also be 180 degrees opposed. In the case of a three start thread form, the three thread starts on the box member will typically be 120 degrees, etc. In other words, a third thread changes the 180 degrees opposition present with two threads, to 120 degrees separation between each of the three threads. This symmetrical separation would change to 90 degrees between each thread for four threads and would change similarly for each additional thread. Also, though shown symmetrically spaced, one skilled in the art understands that the thread start location may be modified to produce thread starts in a configuration other than symmetrical.

Figure 3:
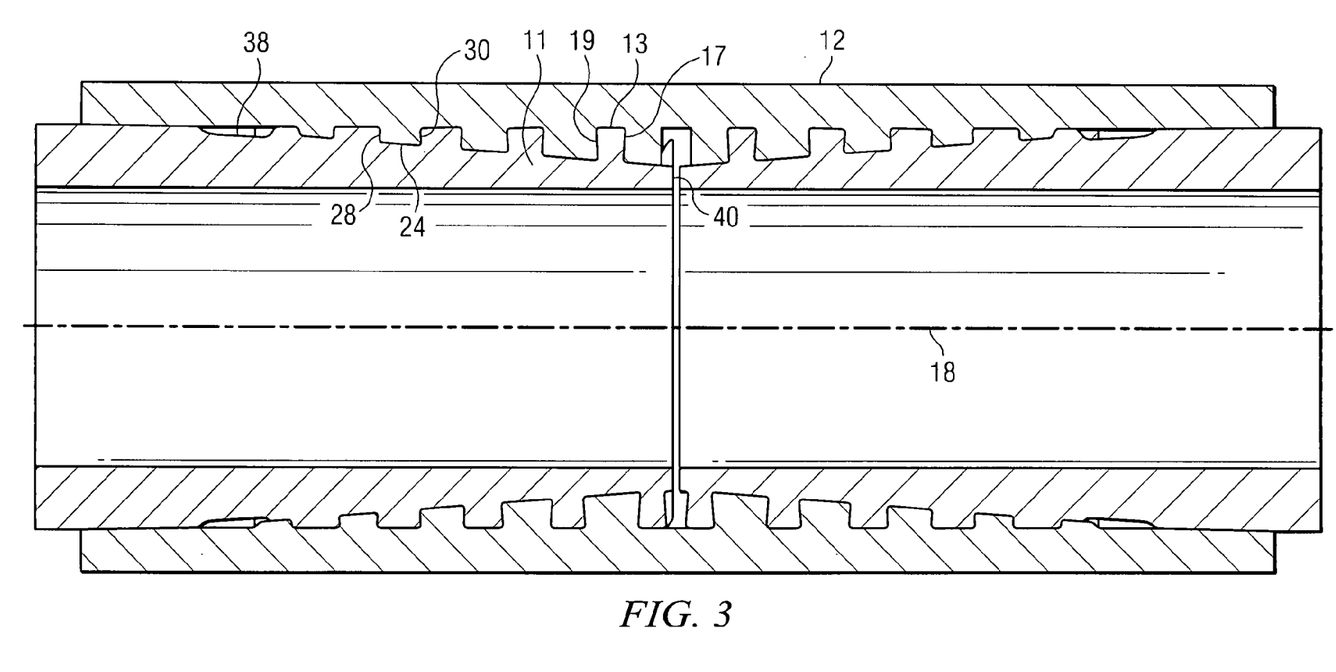
FIG. 3 is a view of the coupling member of FIG. 2 showing two pin ends being received within the box end openings.

The thread forms may be designed so that the complementary roots and crests move into engagement during make-up of the connection in conjunction with the flanks moving into engagement upon make-up of the connection, thus forming sealing surfaces that resist the flow of fluids between the threads, as shown in FIG. 3. It will also be appreciated that the pipe connections of the invention have greater radial interlock at the pin nose because of the unusually high thread height in that area, as previously described. This feature of the design promotes pin nose metal to metal conical seal travel into hoop tension without losing the sealing integrity of the connection. Also, if a metal to metal conical seal is not incorporated into the design, the thread itself can be utilized as a metal to metal seal and not separate radially due to internal pressure and/or external pressure conditions. To the best of Applicant's knowledge, all presently used connections in the oil field industry incorporate what will be appreciated to be very limited and short thread heights as compared to the unique thread design of the invention. This aspect of the current industry designs necessarily limits the radial separation resistance of the connection in the location where it is needed the most.

FIGS. 1-3 illustrate the make-up of a typical connection employing the thread form of the invention. As has been explained, assembly of the pipe string normally involves a pipe joint being added to the existing string, for example, by lowering a section of pipe pin end down, into an upwardly facing box projecting from the drilling rig floor. After being stabbed into position, the added pipe joint is rotated to engage the threads of the pin and box, thereby securing the joint to the pipe string. The connections using the thread forms of the present invention are generally free-running with the respective thread roots and crests, i.e., 13, 24 in FIG. 3, first making contact.

An invention has been provided with several advantages. The thread forms of the invention are capable of coupling tubular pipe sections quickly and efficiently, and form an extremely secure connection. The preferred thread forms of the invention maximizes the thread flank area available in the geometry of the design to thereby maximize the desired properties of the connection. This is accomplished, in part, by minimizing or eliminating any gap between the thread crests and roots of the connection when it is made up to form a pipe joint. The preferred thread form of the invention also minimizes the amount of thread material cut away during the threading operation performed in machining of the thread form. The resulting thread form provides a connection which is high in tensile strength, which can withstand extremely high torque, and which features fast make-up characteristics.

Because the thread forms of the invention maximizes the so-called "real-estate" within a given length of the connection, the result is a reduction in manufacturing costs and maximization of total usable tubular length. The greater thread heights which are inherent in the designs of the invention are of particular benefit when rugged connecting ability is of concern and field repairs are minimized as a result. De-stabbing of the connections of the invention is a relatively quick and easy operation without the worry of thread hang-up during disassembly which is presented by some connections. First thread roll-over due to stabbing abuse is greatly minimized because of the unusually large pin starting threads.

By maximizing the thread geometry of the real-estate of the connection, performance properties are greater than presently designed plain end pipe connections. As a result, it follows logically that incorporating the thread forms of the invention on more expensive upset pipe would increase the performance properties of those pipe so that the resulting properties would be greater than their present day counter parts Non upset connection strength properties of the pipe connections of the invention are comparable to the more common expensive upset connection properties, even though the non upset connection is shorter than the counterpart upset connection.

The connections of the invention also offer the added advantage of a connection which will withstand an increased number of make ups and break outs over the presently available wedge thread connections available in the industry. The inherently shorter connection has lower wear characteristics because less travel is required to make and break the connection.

This unique connection has greater radial interlock at the pin nose because of the unusually high thread height in that area. This helps to ensure pin nose metal to metal conical seal travel into hoop tension without losing its sealing integrity.

Down hole tooling accessories can benefit from this short connection in strategic areas where performance properties are needed and when limited connection length is required. Tooling weight is a factor in all job designs because overall weight can limit the string depth capabilities, with new discoveries being made at greater and greater relative depths over time.

Another advantage of the unique thread design of the invention flows from the way that the thread design combines features of both a cylindrical thread design and a tapered thread design in a way which amplifies the benefits of both forms in one connection. In other words, the cylindrical thread design is the best for non-cross threading abilities, while the tapered thread has the best axial tension/compression capabilities. The thread form of the invention utilizes the benefits of both types of threads.

On a two step thread design, the taper/cylindrical thread design of the invention can be mixed and matched providing an even more robust performance in all of its function and properties, all of which are designed within a smaller design envelope.

While the invention has been shown in several of its forms, it is not thus limited, but is susceptibly to various modifications without departing from the spirit thereof.

What is claimed is:

1. A tubular member having a cylindrical body defined about a central longitudinal axis and having a thread form for making a threaded pipe connection capable of being screwed together and subsequently unscrewed, the tubular member comprising:

a pin member having a pin end with an outer extent and having external threads cut over a given thread length with stab flanks and load flanks and crests and roots for mating with the mating internal threads of a box to make up a pipe connection, wherein the thread crests are cut on an axis which is parallel to the central longitudinal axis of the tubular member and wherein the thread roots are cut on a continuous tapered axis over the entire given thread length with respect to the central longitudinal axis of the tubular body, whereby the threads have a given thread height which is measured between the thread crests and roots, and wherein the thread height varies over the thread length in ever increasing increments in the direction of the pin end outer extent, whereby an imaginary axis drawn in line with the continous tapered axis would eventually extend to intersect the central longitudinal axis of the tubular member.

2. The tubular member of claim 1, wherein the thread form present on the tubular member is selected from the group consisting of parallel flanked threads, positively flanked threads, negatively flanked threads, multifaceted threads, or any combination thereof.

3. The tubular member of claim 2, wherein the thread form present on the tubular member is also a dovetail or semi-dovetail thread form.

4. The tubular member of claim 2, wherein the thread form present on the tubular member is also a multi-start thread form.

5. The tubular member of claim 1, wherein the threads making up the thread form of the connection are wedge threads.

6. The tubular member of claim 1, wherein the connection is used with a tubular selected from the group consisting of oil, gas, construction, water and waste disposal well casing and tubing.

7. A tubular member having a cylindrical body defined about a central longitudinal axis and having a thread form for making a threaded pipe connection capable of being screwed together and subsequently unscrewed, the tubular member comprising:

a coupling member having opposing box ends with opposing end openings, each of the box ends having internal threads cut over a given thread length with stab flanks and load flanks and crests and roots for mating with the mating external threads of a pin to make up a pipe connection, wherein the thread crests are cut on a continous tapered axis which is tapered with respect to the central longitudinal axis of the tubular member over the entire given thread length which extends from a mid-point of the coupling member in either of opposite directions toward the respective box end openings and wherein the thread roots are cut on an axis which is parallel to the central longitudinal axis of the tubular body, whereby the threads have a given thread height which is measured between the thread crests and roots, and wherein the thread height varies over the thread length in ever increasing increments in the direction opposite the box end openings and toward the mid-point of the coupling member, respectively, whereby an imaginary axis drawn in line with either continous tapered axis would eventually extend to intersect the central longitudinal axis of the tubular member.

8. The tubular member of claim 7, wherein the thread form present on the tubular member is selected from the group consisting of parallel flanked threads, positively flanked threads, negatively flanked threads, multifaceted threads, or any combination thereof.

9. The tubular member of claim 8, wherein the thread form present on the tubular member is also a dovetail or semi-dovetail thread form.

10. The tubular member of claim 8, wherein the thread form present on the tubular member is also a multi-start thread form.

11. The tubular member of claim 7, wherein the connection is used with a tubular selected from the group consisting of oil, gas, construction, water and waste disposal well casing and tubing.

* * * * *